July 2, 1940.   D. CROCKWELL   2,206,765
METHOD OF PRODUCING ANIMATED PICTURES
Filed Aug. 25, 1937
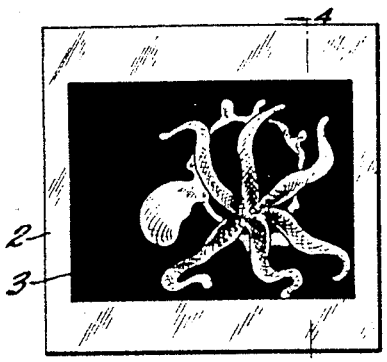
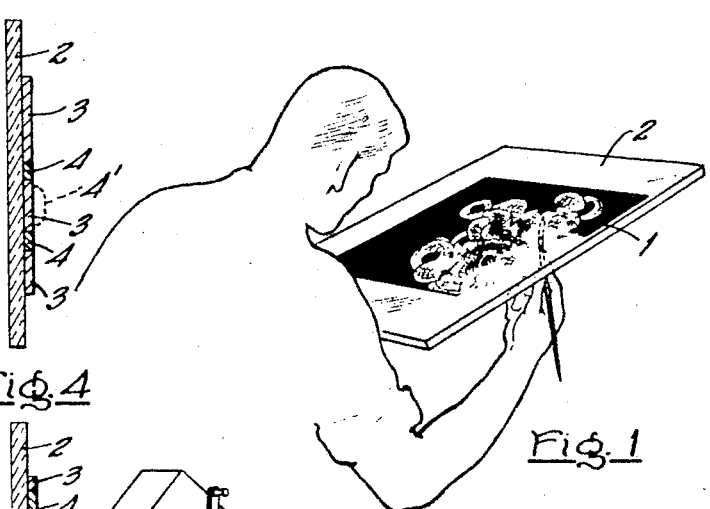
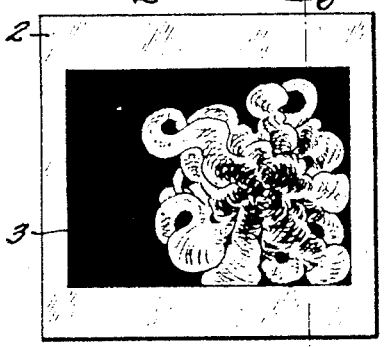
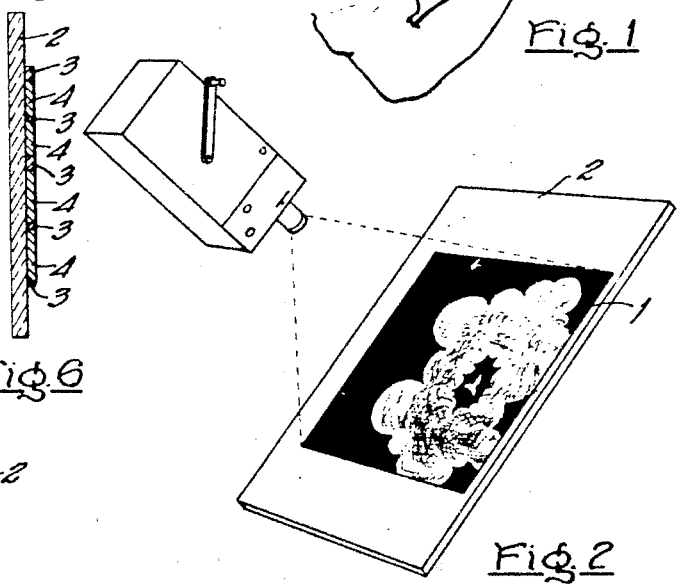
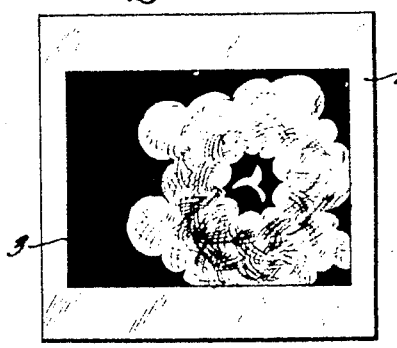
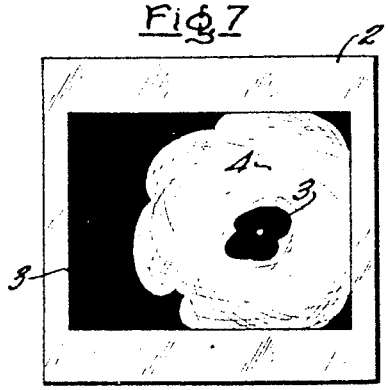
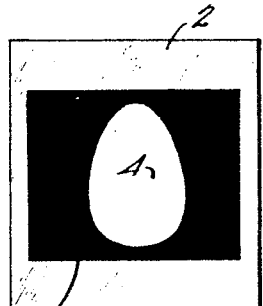
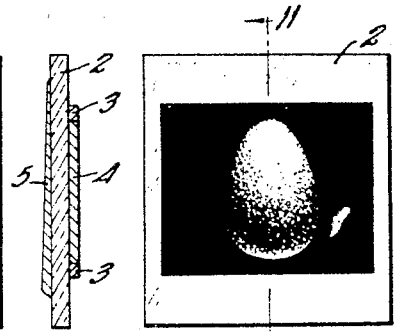
INVENTOR
Douglass Crockwell
by
ATTORNEY Patented July 2, 1940

2,206,765

UNITED STATES PATENT OFFICE 2,206,765

METHOD OF PRODUCING ANIMATED PICTURES

Douglass Crockwell, Glens Falls, N. Y.

Application August 25, 1937, Serial No. 160,781

6 Claims. (Cl. 88—16)

My invention relates to the art known as motion picture animation in which a series of pictures having elements thereof differing slightly but progressively in degree from each other are made and consecutively photographed, one or several frames at a time, on motion picture film in order to obtain the effect of motion in the projected images.

The principal object of my invention is to provide a method of procedure which will permit a series of such pictures to be prepared more expeditiously than is possible by present methods and with greater fluidity and variety in motion effects attained.

Heretofore, in the production of animation, a series of pictures differing slightly but progressively in degree from each other have been made separately, either in entirety or in part, on different sheets which have been consecutively placed before the camera and photographed on motion picture film. In forming such pictures, quick drying inks and paints have been used in order that the products may be resistant to smudging while being handled or stacked.

My method differs substantially from present methods and is described below and illustrated in the accompanying drawing in which—

Fig. 1 is a perspective view illustrating the manner in which the paint is applied to or manipulated upon the back of a transparent medium;

Fig. 2 is a perspective view showing how the painting is photographed through the transparent medium after each modification;

Fig. 3 is a front view of a picture;

Fig. 4 is a section of Fig. 3 in the plane 4—4;

Fig. 5 is a front view of a picture formed by modifying the picture shown in Fig. 3;

Fig. 6 is a section of Fig. 5 in the plane 6—6;

Fig. 7 is another picture or stage formed by modifying the picture shown in Fig. 5;

Fig. 8 is a modification of the picture shown in Fig. 7;

Fig. 9 is another picture;

Fig. 10 is a picture formed by modifying the picture shown in Fig. 9 by the application of a transparent film of color; and Fig. 11 is a section of Fig. 10 in the plane 11—11.

Instead of making a separate drawing or painting for each fraction of a movement to be presented, I propose to apply a slow-drying opaque paint 1 to one side of a sheet 2 of transparent material while observing the progress of the painting or drawing by viewing it, as shown in Fig. 1, through said transparent sheet from the opposite side in order to produce a picture having its face instead of its back against said sheet. The picture, when completed, is photographed, as shown in Fig. 2, through said transparent sheet on one or more consecutive frames of motion picture film. It is then changed slightly to make the next picture in the motion sequence by moving the wet or plastic paint from one position to another in the zone of its contact with the transparent sheet (which may be easily done with brush or palette knife), or by adding paint or removing paint in certain places.

Figs. 3, 5, 7 and 8 show progressive steps of a plastic painting in which the change from stage to stage has been exaggerated and in which only two paints of different color are used to avoid confusion. Fig. 4, which is a section of Fig. 3 in the plane 4—4, shows paints 3 and 4 in contact with the back of the glass 2 and disposed to form the picture shown in Fig. 3. By applying additional paint 4' over the paint already on the back of the glass, as shown in Fig. 4, and thereafter pushing it through the first applied paint and into contact with the glass, the picture is changed to the form shown in Figs. 5 and 6. The paints may be blended in the plane of the back of the glass to produce the effects shown in Figs. 3, 5, 7 and 8, or so manipulated that, in the plane of the glass, there is no blending whatsoever, as shown in Fig. 9 and portions of Fig. 8.

By using a slow-drying paint which may be readily formed by mixing pigments of the desired colors with a slow-drying oil to a plastic consistency, the paint is easily moved about, added to or removed, on the back of a sheet of glass or other transparent material. In this way I obtain certain, quite unusual, plastic effects which are translated into motion by alternately photographing and changing the picture, and which cannot be obtained in any other way of which I am aware. The application of the paint to the back of the sheet flattens that surface thereof which is visible through the transparent medium, and conceals the brush marks which would inevitably show if the paint were applied to the front of the glass. Furthermore, the resistance of the paint itself when new paint is forced through the previously applied layers up to the surface of the transparent sheet (and into view) causes a blending which can be continued smoothly from change to change and which is quite unique.

The picture may be done in black and white, or in color, and in either case unusual color effects may be obtained and quickly changed by thin applications of transparent colors either to the front of the transparent sheet bearing the picture or to one or more transparent sheets mounted in front thereof, or by combining these methods. These color films function as filters and may be changed in a manner corresponding to the changes in the opaque picture in the rear to qualify the form and color of the latter. By applying the transparent colors thinly to the front of the opaque painting, as shown at 5 in Fig. 11, a freedom of manipulation is obtained by which the apparent modeling and color of the opaque picture can be changed as shown in Fig. 10, without actually doing so.

My method permits not only the production of unusual effects in fluidity of form and mobility of color but also eliminates the necessity of making separate pictures on separate media thus lessening the time and effort required to produce a sequence of movements.

It is understood, of course, that after each variation in the opaque picture or its transparent overlay, one or more exposures are made, depending upon the rate of change or movement desired in the projected images.

The term "slow-drying paint", as used in the claims, is to be understood as meaning a coloring medium which will retain its plasticity and mobility and will not so dry or harden, during the time required to carry out my process, that it cannot readily be moved from place to place on the transparent medium or entirely removed therefrom by wiping.

In photographing the pictures it is desirable to prevent the passage of light therethrough from the rear, and since the easiest way of accomplishing this end is to use opaque paint, I have so specified. However, a semi-opaque paint combined with an opaque sheet or dark painting behind it will produce the same result, and hence the term "opaque" is to be understood as including within its meaning coloring media which may be somewhat pervious to light but not transparent.

From the foregoing it will be apparent that my invention is not limited to the production of pictures which are "animated" in the sense that the subject matter thereof "appears" to move because, without moving or changing the base painting in any way whatsoever, the pictures may be endowed with life, animation or at least rapidly or slowly changing characteristics of color by merely changing or manipulating the color films on the face of the transparent sheet. Hence, the term "animated pictures" used herein, is to be understood as meaning something more than merely moving and as including pictures which change in color or other characteristics.

What I claim is:

1. Those steps in the method of producing animated pictures which comprise applying a slow-drying opaque paint to one side of a transparent sheet in a manner to produce the desired picture when viewed through said sheet, photographing said picture through said sheet while said paint is plastic, and then manipulating said paint in its plane of contact with said sheet to produce a slightly different picture and rephotographing through said sheet.

2. Those steps in the method of producing animated pictures which comprise painting the picture with a slow-drying opaque paint on a transparent sheet, while viewing the progress of the painting from the opposite side thereof, whereby to produce a correct picture when so viewed, photographing said picture through said sheet while said paint is plastic, and thereafter alternately manipulating the paint in its zone of contact with said sheet to form consecutive variations of said picture and photographing the same through said sheet.

3. Those steps in the method of producing animated pictures which comprise painting the picture with a slow-drying opaque paint on a transparent sheet, while viewing the progress of the painting from the opposite side thereof, whereby to produce a correct picture when so viewed and one which can be changed by manipulating said paint, coloring said picture by applying a transparent film of color to the unpainted side of said sheet, photographing said picture through said film and sheet before said color film has dried, and thereafter alternately changing said picture by modifying said color film and manipulating said paint in its zone of contact with said sheet and photographing said picture through said film and sheet.

4. Those steps in the method of producing animated pictures which comprise applying a slow-drying, opaque paint to one side of a transparent medium to produce a desired picture when viewed through said medium, photographing said picture through said medium while said paint is plastic, applying additional, slow-drying paint over the paint previously applied while still plastic and forcing it through said previously applied paint into contact with said medium, whereby to produce a modification of the original picture, and photographing said modification through said medium.

5. Those steps in the method of producing animated pictures which comprise applying a slow-drying, opaque paint to one side of a transparent medium to produce a desired picture when viewed through said medium, photographing said picture through said medium while said paint is plastic, applying additional, slow-drying paint over the paint previously applied while still plastic and forcing it through said previously applied paint and blending it therewith in the zone of contact with said medium whereby to produce a modification of the original picture, and photographing said modification through said medium.

6. Those steps in the method of producing animated pictures which comprise applying a slow-drying opaque paint to one side of a transparent sheet in a manner to produce the desired picture when viewed through said sheet, applying a transparent color film to the unpainted side of said sheet, photographing said picture through said film and sheet while said paint is plastic, and then manipulating said paint in its zone of contact with said sheet to produce a slightly different picture and rephotographing through said film and sheet.

DOUGLASS CROCKWELL.